United States Patent
Chao

(10) Patent No.: US 7,475,010 B2
(45) Date of Patent: Jan. 6, 2009

(54) ADAPTIVE AND SCALABLE METHOD FOR RESOLVING NATURAL LANGUAGE AMBIGUITIES

(75) Inventor: Gerald CheShun Chao, Los Angeles, CA (US)

(73) Assignee: Lingospot, Inc., Los Angeles, CA (US)

( * ) Notice: Subject to any disclaimer, the term of this patent is extended or adjusted under 35 U.S.C. 154(b) by 716 days.

(21) Appl. No.: 10/932,836

(22) Filed: Sep. 2, 2004

(65) Prior Publication Data
US 2005/0049852 A1 Mar. 3, 2005

Related U.S. Application Data

(60) Provisional application No. 60/500,060, filed on Sep. 3, 2003.

(51) Int. Cl.
G06F 17/28 (2006.01)
G06F 17/21 (2006.01)
G06F 17/26 (2006.01)

(52) U.S. Cl. ............... 704/10; 704/7; 715/255; 715/271

(58) Field of Classification Search ............ 704/7, 704/10; 715/255
See application file for complete search history.

(56) References Cited

U.S. PATENT DOCUMENTS

| | | | | |
|---|---|---|---|---|
| 4,965,763 | A * | 10/1990 | Zamora | 704/1 |
| 5,146,405 | A | 9/1992 | Church | |
| 5,309,359 | A | 5/1994 | Katz et al. | |
| 5,541,836 | A * | 7/1996 | Church et al. | 704/7 |
| 5,737,617 | A | 4/1998 | Bernth et al. | |
| 5,794,050 | A | 8/1998 | Dahlgren et al. | |
| 5,873,056 | A | 2/1999 | Liddy et al. | |
| 5,887,120 | A * | 3/1999 | Wical | 706/46 |
| 5,930,788 | A * | 7/1999 | Wical | 707/5 |
| 5,963,940 | A | 10/1999 | Liddy et al. | |
| 6,101,492 | A | 8/2000 | Jacquemin et al. | |
| 6,253,170 | B1 | 6/2001 | Dolan | |
| 6,631,346 | B1 | 10/2003 | Karaorman et al. | |
| 6,675,159 | B1 | 1/2004 | Lin et al. | |
| 6,714,905 | B1 | 3/2004 | Chang et al. | |

OTHER PUBLICATIONS

Ferran Pla, Antonio Molina and Natividad Prieto "Tagging and Chunking with bigrams", ACL Coling 2000, vol. 2, 18th International Conference on Computational Linguistics, pp. 614-620.*

(Continued)

*Primary Examiner*—David R Hudspeth
*Assistant Examiner*—Justin W Rider
(74) *Attorney, Agent, or Firm*—Lewis Brisbois Bisgaard & Smith LLP; Sanford Astor

(57) ABSTRACT

A method for resolving ambiguities in natural language by organizing the task into multiple iterations of analysis done in successive levels of depth. The processing is adaptive to the users' need for accuracy and efficiency. At each level of processing the most accurate disambiguation is made based on the available information. As more analysis is done, additional knowledge is incorporated in a systematic manner to improve disambiguation accuracy. Associated with each level of processing is a measure of confidence, used to gauge the confidence of a process in its disambiguation accuracy. An overall confidence measure is also used to reflect the level of the analysis done.

30 Claims, 4 Drawing Sheets

OTHER PUBLICATIONS

G. Zhou and J. Su. 2002. 'Named entity recognition using an hmm-based chunk tagger'. In Proceedings of the 40th Annual Meeting of the Association for Computational Linguistics (ACL 2002), pp. 473-480, Philadelphia, PA.*

Jurafsky and Martin, Speech and Language Processing: An Introduction to Natural Language Processing, Computational Lingistics, and Speech Recognition, Prentice Hall, 2000.

* cited by examiner

ADAPTIVE AND SCALABLE METHOD FOR RESOLVING NATURAL LANGUAGE AMBIGUITIES

CROSS-REFERENCE TO RELATED APPLICATIONS

This application is entitled to the benefit of Provisional Patent Application Ser. No. 60/500,060, filed 2003, Sep. 3 by the present inventor.

FEDERALLY SPONSORED RESEARCH

None.

SEQUENCE LISTING

None.

BACKGROUND OF THE INVENTION

The present invention relates generally to natural language processing, and more particularly to an improved method and system to adapt to the users' need for accuracy and efficiency in resolving ambiguities in natural language.

Natural language is the most common method of communication between humans, used in conversations, emails, etc. Using natural language as a common medium, people exchange information and knowledge via a well-formed but complex process. A speaker or writer first produces a message via the process of generation, whereby words are chosen and organized to best represent some information or knowledge. The listeners or readers then process the message to extract the meaning intended by the originator, completing the information transfer.

Understanding this process of information transfer is the central goal of the field of natural language processing (NLP). In doing so it would enable us to recreate the process in intelligent systems, providing computers the means to extract and operate on information and knowledge represented using natural languages. A reliable NLP model can then be used to improve tasks such as human-computer interface, information retrieval, information extraction, machine translation, and question answering.

NLP is a challenging problem because of the ambiguities prevalent in all natural languages. These ambiguities occur at multiple levels, including the word level, sentential level and discourse level.

A word can belong to multiple part-of-speech (POS) categories. For example, "check" can be both a noun and a verb. A word can have multiple senses, or is polysemous, such as the word "bank" which can mean "financial bank" or "river bank". Even punctuations can be ambiguous, such as a period can denote end of sentences, abbreviations, decimal points and others. Proper nouns can also be ambiguous, such as "Washington", which can refer to a person, a state, an university and others. Determining the correct meaning of a word is referred to as word sense disambiguation (WSD). Determining the correct type of proper noun is the task of Named Entity Recognition (NER).

At the sentential level structural ambiguities is the most common. The famous joke "I shot the elephant in my pajamas; how it got into my pajamas I'll never know" is ambiguous. That is, the phrase "in my pajamas" can be modifying the verb "shot", as "attended in his nicest suit", or it can be modifying "elephant", as in "the clown in floppy shoes". Resolving structural ambiguities is done by a sentential or syntactical parser.

References made by pronouns and determiners are often ambiguous and can exist both at the sentential or the discourse (cross sentences) level. In the example "Mary wanted to ask Jane before she changes her mind.", the pronouns "she" and "her" can refer to either Mary or Jane. This is the problem of anaphora resolution.

Resolving these ambiguities is important in reliably determining the meaning and extracting knowledge represented using natural languages. Ignoring these ambiguities leads to reduced accuracy and effectiveness of systems working with natural languages. An example of this is a search engine returning documents about wristwatches when the query was "global security watch".

One of the main challenges of accurate NLP is the combinatorial explosion if all possible combinations of ambiguities are exhaustively evaluated. This is a well-known problem in NLP and various approaches have been proposed.

A common one is referred to as a rule-based approach, where a set of rules in various forms such as grammars, first-order logic, and common-sense knowledge is used to accept and conversely reject interpretations. Given sufficient rules, a NLP model could eliminate wrong interpretations and only produce plausible ones. However, these rules and knowledge usually are authored by humans, therefore requiring monumental engineering efforts. The richness and constantly evolving nature of languages also means that this task is never complete.

A different approach is referred to as data-driven, in that machine-learning algorithms are used to train on annotated data that contain disambiguated annotations. A good illustration of these two approaches is the task of email filtering, to automatically identify unsolicited commercial email. A rule-based system would require a person to write set of rules for detecting junk email, such as one that detects the subject line containing the pattern "lose ### pounds in ### days!". However, because of the variability of natural languages in expressing the same concept, one can see that this rule can be easily circumvented. Examples include "get rid of ### pound . . . ", "make ### pounds disappear . . . ", and "be ### pounds lighter . . . ". One can see the engineering efforts needed to capture just one single concept.

An alternative is to gather a collection, or a corpus of emails, with the added annotation of whether each email is considered junk or not. A machine-learning algorithm can then be trained to reproduce this decision as accurately as possible. This requires minimal engineering effort, and one that can adapt to changing solicitations by continually training the model with new junk emails. Machine-learning algorithms are also steadily improving in accuracy, making automatic disambiguation more reliable.

However, data-driven approaches using powerful machine-learning algorithms still cannot escape the combinatorial explosion mentioned earlier. To limit the computational complexity, assumptions are often made to simplify the task.

One such simplification is to treat an input document as a "bag of words", in that words are either present or absent, irrespective of how these words are arranged to compose sentences. This approach improves efficiency and has been shown to improve certain tasks such as text classification and information retrieval. However, it makes a very strong assumption about linguistic structure, illustrated in the following four sentence fragments:

"painting on the wall"

"on painting the wall"
"on the wall painting"
"the wall on painting"

A "bag of words" approach would treat these four fragments all as equivalent, since they contain the same four words. However, a human reader knows that each has a different meaning.

Another simplification is to make Markov assumptions, which states that a decision at the current word is only dependent on n-previous words of the same sentence. This approach is often applied to tagging, which is the task of associating a tag with each word, such as its part-of-speech tag. This approach has been shown to be very effective for a number NLP tasks, such as POS tagging, shallow parsing, and word sense disambiguation.

However, Markov assumption makes a strong simplification that dependencies are nearby, although long-distance dependencies within natural language are well known. We illustrate this property with the following sentences:

"Apple fell"
"Shares of Apple fell"
"The man who bought shares of Apple fell"

If only local context is used for "fell", it would appear that "Apple" fell in all three sentences. In actuality it is "shares" that fell in the second sentence and "the man" in the third.

These long-distance dependencies can be recovered via full sentential parsing, where syntactic units such as "who bought shares of Apple" are identified as a modifier of "The man". In doing so parsing can recover that "The man" is the subject of "fell" and not "Apple" and "shares". Unfortunately, parsing is a very complex process with a potentially exponential time complexity with respect to the sentence length. Reliable parsing can also involve semantics, high-level knowledge, and even reasoning and inferential processes.

Even with the most efficient parsing algorithms that make certain independence assumptions, parsing has a cubic time complexity, as opposed to linear for Markovian (tagging) processes. Therefore, it can become a severe bottleneck for NLP systems and often precludes them from practical applications or large-scale deployments. For example, most users would probably consider it unacceptable for an email filter program to take one minute or more to process each piece of incoming email.

However, it is not inconceivable that in certain domains where accuracy is paramount, one would devote the resources needed for in depth analysis, such as processing legal or medical documents. What is currently lacking is a method for natural language processing that is adaptive to the need of the user, striking a balance between accuracy and available resources. Such a system would be scalable to the constantly increasing computational power, as well as improvements in NLP technologies. An adaptive and scalable method is thus more amicable to sustainable, large-scale deployments by adjusting the tradeoff between accuracy and efficiency to best match the changing needs of users and advancing technologies.

PRIOR ART

The field of NLP has a long and rich history, encompassing linguistics, computer science, psycholinguistics, and others. Many models and systems, both research and commercial, have been proposed and investigated. Despite many years of effort, NLP has yet reached mainstream commercial success. We attribute this predicament to three main issues:

1) Lack of integration: due to its enormously complex nature, NLP has been approached using the "divide and conquer" technique in order to improve tractability and efficiency. That is, the problem is broken down into sub-problems and then studied in isolation. (e.g., U.S. Pat. No. 5,146,405 for POS tagging and U.S. Pat. No. 6,253,170 for WSD). However, information generated from one sub-problem is often not utilized by another, creating a fragmented landscape that makes it difficult for a single NLP system to integrate. Issues of representation, linguistic formalisms, training data, need for manual intervention and others can all play a role in hampering integration. For models that do manage to integrate different NLP components, they fail to address the next issue.

2) Efficiency and scalability. Often a model would integrate computationally expensive stages such as sentential parsing and anaphora resolution, which would effectively make the model impractical for even modest sized document repositories, let alone the world wide web (e.g., U.S. Pat. Nos. 6,675,159, and 6,714,905). Furthermore, if the model requires extensive manual maintenance (e.g., grammar writing, human annotation, knowledge-base building), its scalability to process rapidly growing repository becomes questionable. Examples of such models include U.S. Pat. Nos. 5,309,359, 5,737,617, 5,794,050, and 6,631,346. Even if the efficiency and scalability issues are addressed, the third issue is most crucial one that is ignored by almost all NLP systems.

3) Failure to address disambiguation errors. Even under ideal conditions and performing the most accurate NLP process, POS tagging, the error rate of the current state-of-the-art tagger is about 1 in 30 to 50 words. The error rates are even higher for more complex tasks such as parsing and WSD. Usually these errors are either simply ignored, or assumed to not affect the end results by existing systems. In actuality these errors are either compounded, or worse amplified, as they pass from one NLP stage to another. The final NLP output can potentially contain so many errors that the benefits and value NLP is suppose to add are canceled out. Thus, this failure to address errors degrades the usability and reliability of NLP-enhanced systems, since human users, the ultimate agents at language disambiguation, can spot error readily and can thus become frustrated at or dismissive of such systems. Examples of NLP models that don't address this issue include U.S. Pat. Nos. 5,873,056, 5,963,940, 6,101,492, and 6,675,159.

Therefore, there is a need for a new approach for NLP that addresses these three issues so that it can be applied to the real world in an integrative, scalable, and error-tolerant manner.

OBJECTS AND ADVANTAGES

The present invention is an improved method for resolving ambiguities in natural language by organizing the task into multiple levels of analysis in successive depths. This process can stop at any level based on the needs of the user, thus improving efficiency and is thus more scalable. However, if more levels of processing is done, the additional information recovered is integrated into the previous levels to improve the overall accuracy. Lastly, since the model is probabilistic and data-driven, it requires minimal manual effort. More importantly, a probabilistic NLP model produces a measure of confidence of its disambiguation decisions. This information represents the reliability of the model's outputs, thus allowing applications that utilize the NLP output to account for the likelihood of errors.

For example, a information retrieval system can rank NLP processed documents based on how confidant, or conversely how error-prone, the disambiguation was. The user would thus first see in the results the most reliable documents, followed by those more likely to have errors. Another possibility is for a machine translation system to present to the user an alternate translation based on a secondary disambiguation for a sentence that the NLP model has low confidence in its primary disambiguation.

We refer to this method as Adaptive Language Processing (ALP), in that the processing done is adaptive to a system builder's need for accuracy and efficiency. ALP can be described as a "best-effort" approach to language processing. That is, at each level the most accurate disambiguation is made based on the available information. For example, word senses can be initially determined based on local context, i.e., by making Markov assumptions. As more analysis is done, such as parsing to determine long-distance dependences, this knowledge is incorporated in a systematic manner to improve WSD accuracy.

Associated with each level of processing is a measure of confidence, used to gauge the confidence of a process in its disambiguation accuracy. An overall confidence measure per document is used to reflect the level of the language analysis done, the NLP technologies used in the disambiguation, and the amount of training data available at the time. This measure allows for automatic integration of improvements to the NLP process, such as better algorithms and more training data. That is, applications based on these disambiguated NLP outputs will automatically improve by taking into account this measure of confidence. Thus, as the NLP model improve, so would the applications that utilize this NLP information, without any re-engineering effort.

The tradeoff with each deeper level of analysis is that more computational resources are needed. However, since analysis can be limited to any of the levels, the system builders can selectively process documents to varying depths based on matrices such as document importance or popularity, and available computational resources. This flexibility affords the system-builders greater ease in deploying systems based on the present method since it requires less "up-front" cost, and allows the investment in resource to be parlayed.

In one possible embodiment, a system can first process all documents quickly with broad strokes, e.g., only one level deep. The disambiguated outputs can then be put to use immediately, such as improving information retrieval and machine translation. The documents can then be reprocessed with a finer brush, i.e., with deeper levels, to improve the disambiguation accuracy as needs arise.

Another possible embodiment is to apply this method as an assistant to human annotators, who are the most accurate agents of language disambiguation but also the least efficient and most expensive. Nevertheless, the present invention can be used to first automatically generate documents with disambiguated annotations. Human annotators then only need to fix the errors made by the ALP system, reducing the amount of work required. The manually inspect documents would be of very high quality, reflected by the elevated confidence measures.

Lastly, with sufficient accuracy or human correction, disambiguated documents can then be used as training data for each of the modules within ALP to further improve their accuracy. Because the ALP system is completely data-driven, re-training of the modules requires no manual effort. This approach allows for a positive feedback loop to be created, having a system that automatically improves as more documents are processed and corrected. The present invention thus addresses all three issues hampering wide-spread NLP adoption, namely one that is integrated, efficient, scalable, more error-tolerant, and potentially self-improving.

SUMMARY OF THE INVENTION

A method for resolving natural language ambiguities using an integrative, efficient, and robust approach. The method is integrative by combining the outputs from different stages of language processing to improve the overall accuracy. Furthermore, the method uses a probabilistic and data-driven approach to minimize manual effort and thus improves scalability. Lastly, this method generates a measure of confidence in its outputs such that the likelihood of errors is quantified. The disambiguated output can then be leveraged by other applications to improve their ability to discern language ambiguities.

DETAILED DESCRIPTION OF THE FIGURES

Figure 1:
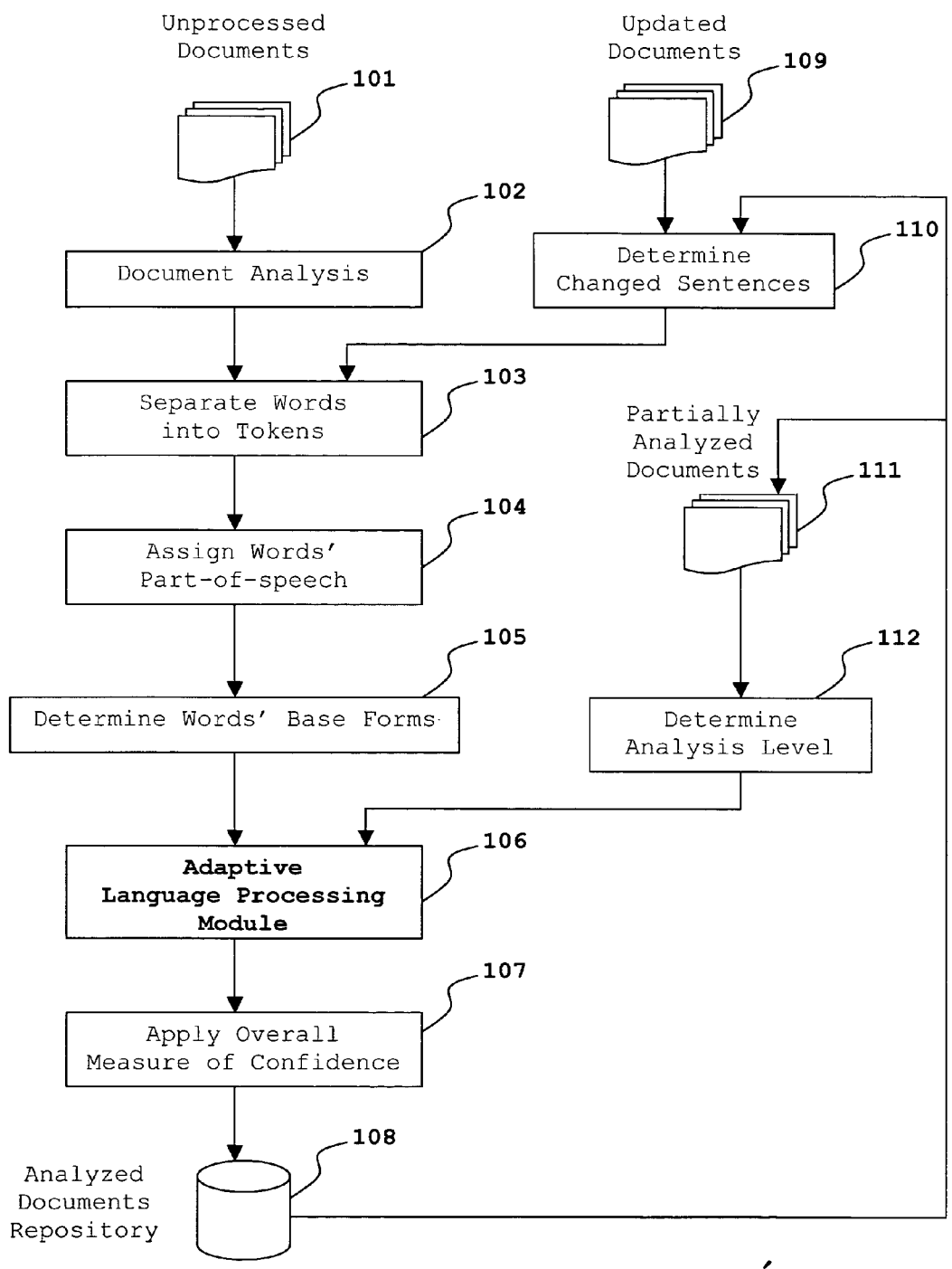
FIG. 1 is a flowchart of a method for analyzing documents to resolve natural language ambiguities.

FIG. 1 is a flowchart of a method for resolving natural language ambiguities within the input documents. A previously unprocessed document 101 first goes through a document analysis 102 step, where extraneous information such as formatting is removed to extract the textual portions of the documents. Additionally, the boundaries of sentences are determined. Given each sentence, the next step 103 tokenizes the input, e.g., words are separated from the punctuations and hyphenated words decomposed. This step is often aided by a dictionary containing abbreviations, contractions, etc., to improve its accuracy.

Next, the part of speech for each word of the sentence is determined by a part-of-speech tagger 104. POS tagging is one of the most well-studied topics in NLP and also the most accurate. As long as the POS tagger is probabilistic and data-driven, it can used by the ALP model. A dictionary is often used to lookup the known POS tags for a given word. However, if a word is not in the dictionary, the POS tagger simply considers all possible POS tags.

The step of 105 is to determine each word's base form based on its part-of-speech tag, such as base form of "applying" is "apply". A dictionary is usually used for this step; this conversion is not done for words not in the dictionary.

The preprocessing steps 102 through 105 are done as a prelude to the Adaptive Language Processing module 106. These steps are standard procedures and thus a person skilled in the art would be able to write computer programs to perform these preprocessing steps.

There are two additional types of documents this method accounts for. If a document was updated or changed 109, it is not reprocessed in its entirety. Instead, only the sentences that were modified or added are determined by step 110, done easily by first extracting the textual content and followed by the UNIX command "diff", comparing the updated document with the existing one from the Analyzed Document Repository 108. In doing so unchanged sentences need not be reprocessed to improve efficiency. The modified or new sentences are then processed via the same steps as sentences from new documents.

Another scenario is that a document is only analyzed partially 111, in that only some or none of the in-depth analysis has been done. In this case, the level of the previous analysis is determined 112 by the markup added to the document and stored in the Repository 108. Documents of these type are sent directly to the ALP module, bypassing the preprocessing steps to minimize duplicated effort.

The Adaptive Language Processing (ALP) module 107 contains the core of the present invention and is described in more detail in the next figure. The output of this module is the confidence measure associated with each natural language disambiguation.

A second component of the confidence measure is associated with the entire document 107, which is specific to the level of processing performed to reflect the accuracy of the processing done. For example, if only word sense disambiguation is done and it is 70% accurate on average, a score of 0.7 is applied to the overall document. If full parsing is done and it improves the accuracy to 80%, this is reflected by increasing the confidence measure. In addition to the depth of the processing done, this measure can reflect the writing style, e.g., scientific versus literary, on the topic, e.g., business versus sports, and the amount of training data available. The granularity of confidence measure is flexible and dependent on the system builder's assessment of the NLP system.

Lastly, the analyzed documents are saved in a repository 108, such as in files and databases, containing the original document and the added annotations from language disambiguation. The documents can be stored as a whole, or subdivided into sections, paragraphs, sentences, and phrases. The format is dependent on the utility of the processed documents to applications such as for information retrieval, information extraction, machine translation, etc.

These applications not only benefit from having the language ambiguities resolved, but also the confidence measures that account for NLP errors. In doing so users can be presented with high quality results first. As more language processing is done or as NLP technologies improve, these confidence measures are raised to reflect the improvements. Thus applications built upon the ALP model will automatically improve the quality of their results as well, without any re-engineering effort.

Figure 2A:
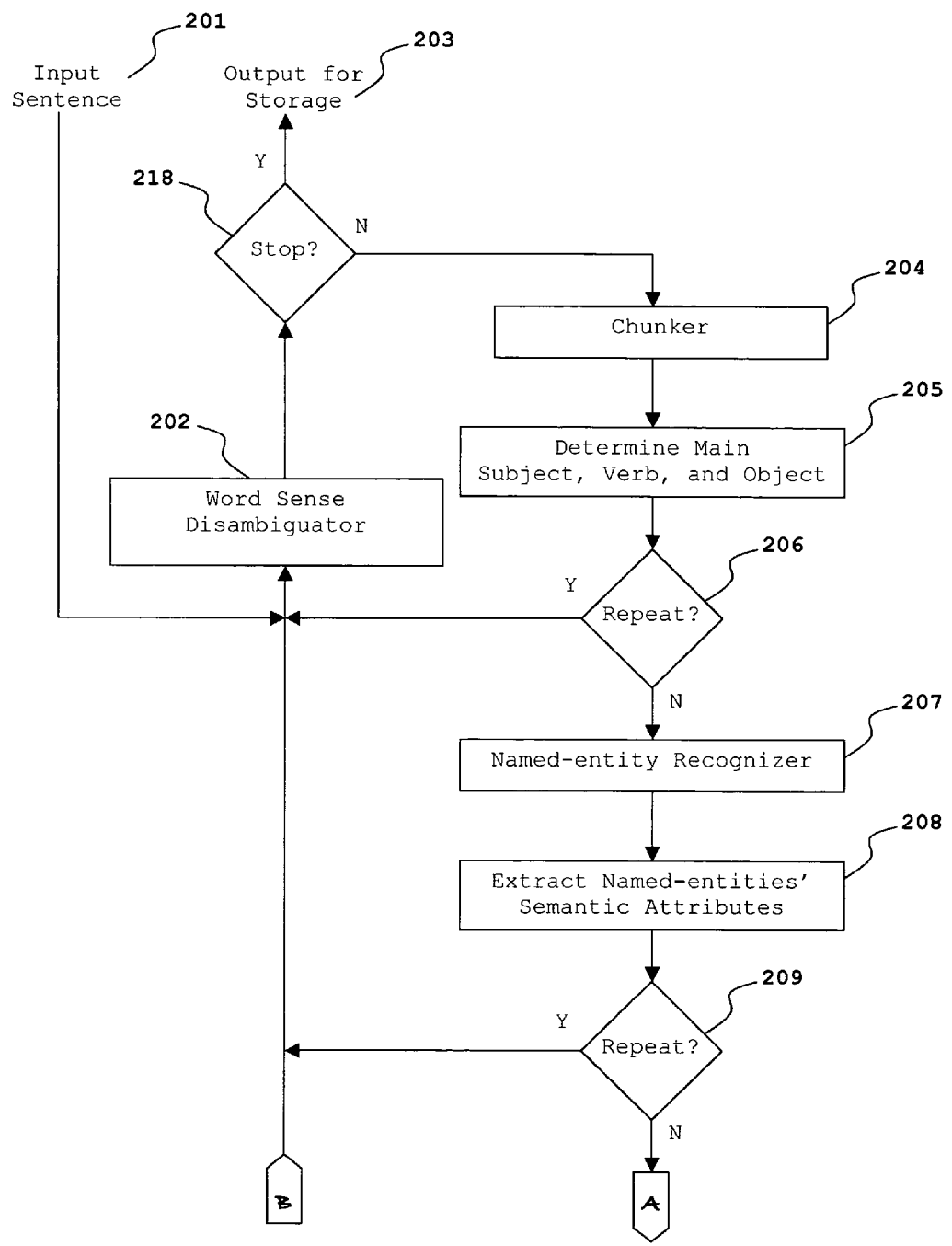
FIG. 2A and FIG. 2B are two parts of a flowchart of a method for resolving natural language ambiguities that is adaptive to the users' needs for efficiency and accuracy.
Figure 2B:
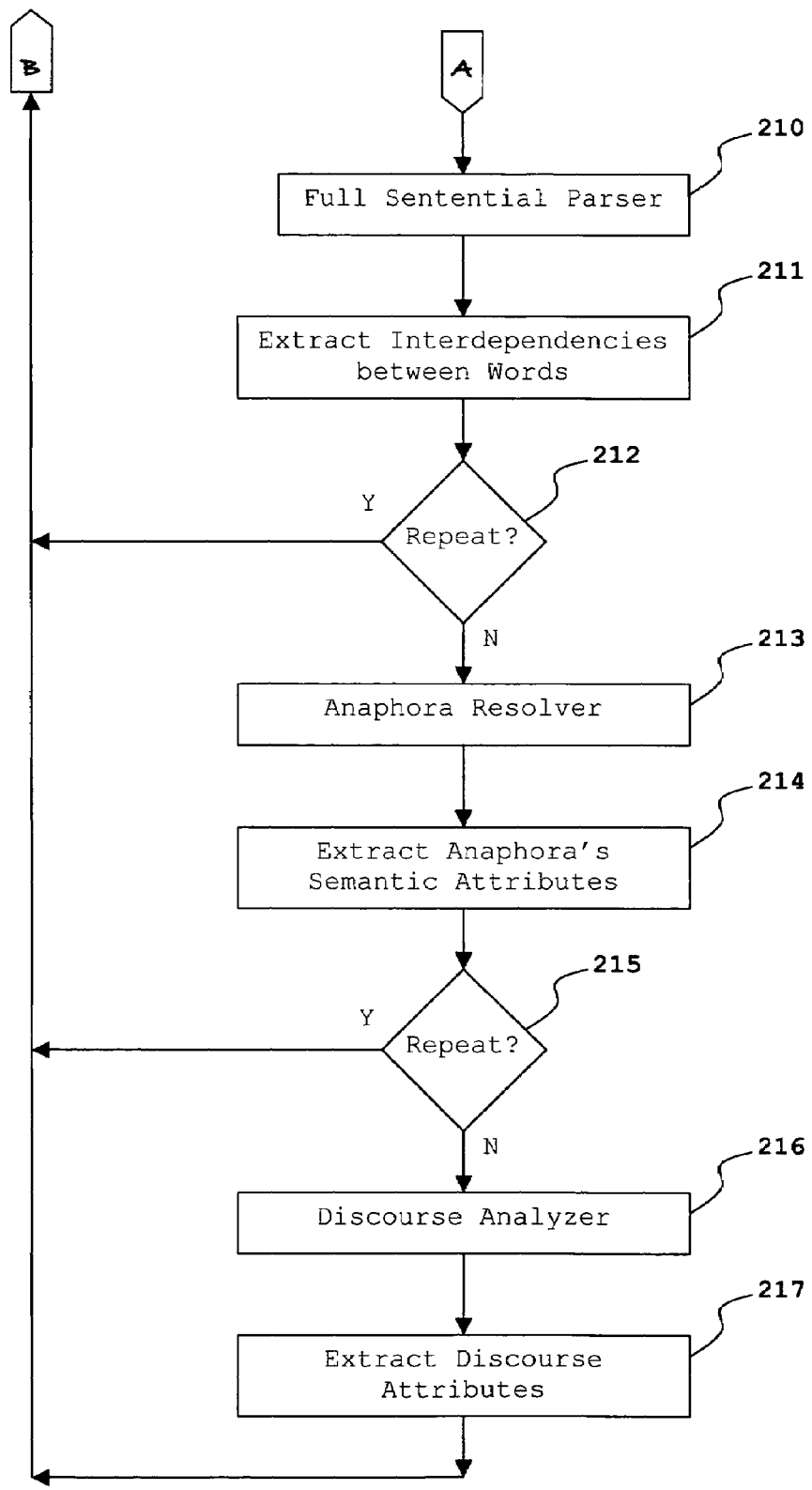

FIGS. 2A and 2B are two parts of a detailed flow chart of how the Adaptive Language Processing (ALP) model 106 processes input documents. The central technique can be summarized as the following: resolve language ambiguities as accurately as possible based on the information that is available at the present level of analysis.

For example, if only the word forms and their POS tags are known, the WSD module 202 will only use this information to best resolve word sense ambiguities. However, if full parsing that resolves structural ambiguities is done, this added information is integrated by the WSD model to further improve its disambiguation accuracy. The effectiveness of this approach was introduced and demonstrated in Chao (2003), which is described in more detail in the FIG. 3.

Therefore, the general structure of the ALP model is a set of loops, each constituting a deeper level of language processing. The additional information recovered from each deeper level is reprocessed by all of the preceding modules to improve the overall accuracy. This improvement in accuracy is reflected by an increase in the confidence measure.

In the flowchart illustrated in FIGS. 2A and 2B, there are six language analysis modules: 1) Word Sense Disambiguator 202, 2) Chunker 204, 3) Named-entity Recognizer 207, 4) Full Sentential Parser 210, 5) Anaphora Resolver 213, and 6) Discourse Analyzer 216. Each of these modules adheres to the "best-effort" technique, in that they disambiguate with the information currently available to them. As more analysis is done, the added information is used by each module to make more informed decisions and thus improving its accuracy.

The input to the overall process is a part-of-speech tagged sentence 201. This input is first processed by the WSD module 202. A lexical database that stores the possible senses of each word is used and it can be a dictionary, an ontology, or automatically generated via unsupervised learning.

There are many approaches to performing WSD, including Hidden Markov Models, maximum entropy models, neural networks, and others. Similar to POS tagging, the specific algorithm is not important as long as it is a probabilistic, data-driven approach such that it can be trained using annotated data and then computes a probability for a word sense.

The output of the WSD module, after its first pass, can either be produced as output of the ALP module 203, constituting the shallowest level of processing, or be fed back into the processing loop for additional analysis.

At the second level of analysis is the chunker, or shallow parser 204. A chunker identifies multi-word phrases, such as the noun phrase "United States Patent and Trademark Office" and the verb phrase "will be announcing". These phrases are then treated as individual units, or reduced down to their "head" words such as "Office" and "announcing". In doing so the length of a sentence is shortened to improve efficiency for later processing levels. Chunking also allows for the main subject, verb and object (SVO) of a sentence to be quickly identified 205. This is because chunking is treated as a tagging task and has a linear complexity with respect to the sentence length. This is in contrast to a full parser that has a potentially exponential complexity.

The chunker model is treated similarly to POS tagging, in that each word is probabilistically assigned a chunk tag. One can simply re-train the POS tagger to produce these chunk tags. Thus the exact algorithm used is again not important, as long as it is probabilistic and data-driven.

The output from the chunker, in the form of phrases and the main SVO's, can either 206 be sent back to the WSD module to improve WSD accuracy, or be further processed by the Named entity Recognizer (NER) 207. Named entities are proper nouns such as names of individuals, countries, companies, holidays, addresses, etc. Identifying and differentiating named entities is useful for WSD since the semantic properties of an ambiguous proper noun, such as whether Washington being an individual versus a company versus a location, are quite different.

For example, an individual can laugh but not a company or location, whereas a location can be tilled but not for an individual or company. Therefore, identifying the semantic attributes of these entities helps to eliminate implausible and erroneous interpretations. The named-entity recognition task can be done efficiently by treating it again as a tagging task by a probabilistic, data-driven classifier. Often it is also done with the aid of a gazette that contains common names of individuals, cities, countries, etc.

The output of the NER module is then converted into semantic attributes 208, such as a person is a living organism versus a company is a man-made organization versus a city is a fixed, geographic location. This information can either 209 be fed to the WSD module to improve its accuracy, or to the full sentential parser 210, shown in FIG. 2B.

A full sentential parser recovers the syntactic structure of a sentence, usually in the form of a parse tree. A parse tree is an hierarchical representation of how syntactic units of a sentence, called constituents, modify and relate to each other. Parsing has a long history and diverse approaches, which we can only summarize here. Usually a grammar, which is a set of rules describing acceptable constructs of a particular language, is used to govern the parsing process. That is, the parser explores a potentially exponential number of parse trees while relying on the grammar to reject construct without applicable rules as linguistically invalid. Traditionally grammars are manually written by linguists, but fortunately they can be automatically induced from training data that has parse tree annotations.

Regardless of the source of the grammar, multiple parse trees can be deemed as acceptable by the grammar. To determine a single parse tree that is the most plausible, valid parse trees can be scored based on their probabilities. The process of finding the most probable parse tree is referred to as parsing disambiguation, and these probabilities are computed by training the parser using the same annotated data as the ones used for grammar induction.

The main benefit of parsing is the recovery of long-distance dependencies between words 211, instead of relying on local information as illustrated earlier. This improves WSD accuracy by more reliably extracting predicate-argument structures and modifier-modifyee relationships, for example. The sentential structure is also valuable for many other tasks, such as information retrieval, question answering, and machine translation.

The drawback of parsing is that most parsing algorithms require at least cubic time with respect to the sentence length, a computationally expensive process when compared to tagger-based tasks. Some propose to perform parsing in parallel on multiple processors, while others use greedy heuristics to improve efficiency at the expense of lowering the accuracy. The tradeoff is between accuracy and efficiency, a property that can be tuned by the system builder and be reflected by the confidence measures with ALP. That is, when speed is important, less accurate parsing algorithms can be used, but also given a lower confidence. When greater accuracy is needed, less efficient parsers can be used to recover more accurate parses.

Therefore, the specific parsing algorithm used in the ALP module can be made to adapt to the users' needs. Currently probabilistic, lexicalized, bottom-up chart parsing is the most accurate, while non-lexicalized parsing is more efficient but also less accurate. The parsing algorithm presented in Chao (2003) can be configured for either lexicalized or non-lexicalized parsing. Furthermore, it can incorporate semantics-based attributes to improve parsing accuracy, part of the integrative approach of ALP.

Thus, given the needs of the users, the parsing step can be adjusted to fit their needs for accuracy and efficiency. The parsing output can either 212 be sent back to the WSD module or for deeper level of processing.

Even with a full sentential parse, ambiguities due to the references made by pronouns and determiners such as "they", "it", "the", etc., remain unresolved because they usually cross sentence boundaries. Determining which noun or noun phrase a pronoun refers to is done by the Anaphora Resolver module 213. Although anaphora resolution does not require full parsing and can therefore be done prior to parsing, sentential structures can improve its accuracy.

The benefit of resolving these references is that the semantic attributes of the anaphora can be recovered 214. This is similar to attributes recovered by named-entity recognition, in that an anaphor can refer to an individual, a company, an object, etc. These attributes can then be used to improve WSD accuracy, as well as parsing.

Anaphora resolution is treated in ALP as an alignment problem, where each anaphor is aligned with its antecedent (the entity it refers to). Having the chunker identifying all the noun phrases and the NER extracting their semantic attributes, the anaphora resolution model take this as context to classify the best antecedent for each anaphor. Simple rules such as gender matching and human/non-human distinction can be added easily.

Lastly, additional analysis at the discourse level 216 can be done to recover macro-level attributes 217, such as the discourse structures, main subjects, categories, and timelines. As the basic level, discourse analysis can identify the document category, such as classifying a document as a sports or science category. This again is a classification problem, using the document as context and its category as the outcome. What NLP offers is the improved accuracy, due to the deeper analysis of the text to better extract its meaning, as opposed to a "bag of words" model.

The main topic of a discourse is also more easily and reliably extracted since the main subject, verb and objects are extracted by the chunker and the parser. A classifier can then use this as context to determine the main subjects and central characters of the discourse. Timelines can be constructed easily since dates and times are extracted by the chunking and the NER modules. Collocated phrase, i.e., ones occurring nearby, are used to describe the significance of the dates.

If a full recovery of discourse structure is desired, an applicable discourse template is first identified based on the document category or topic, such as a sports event, a court case, or a frequently asked questions page. The different roles within the templates are then filled by individual classifiers trained to identify the most probable match, similar to the alignment procedure of anaphora resolution. Once the roles are filled for a template, information such as the teams in a sports event or the plaintiffs described within the documents can then be extracted.

Discourse analysis constitutes as the deepest level of text understanding in this embodiment and is also expensive computationally. The effort is worthwhile since reliable word sense disambiguation often requires broader contexts of the entire discourse. Also, ambiguous references can also involve building the discourse structure to best determine the correct antecedents. Difficult parsing decisions such as coordination can be aided by discourse-level contexts as well. With the iterative structure of the ALP module, information recovered from the discourse analysis is fed back to each of the earlier processing steps to improve the accuracy.

The last step is to determine when the ALP loop should terminate 218 (FIG. 2A). This is necessary because of the iterative refinement method used by ALP. That is, by integrating information from various levels, each module can correct errors made previously with less-informed context. The termination condition is decided by comparing the resulting probability of the current iteration to that from the previous iteration. If the current probability is the same or less than the previous iteration, the interpretation from the last iteration is produced as output. However, if the current probability is higher, ALP can continue to iterate until no improvement is observed. Users can also set a limit on the maximum number of iterations done, but typically two is sufficient.

Figure 3:
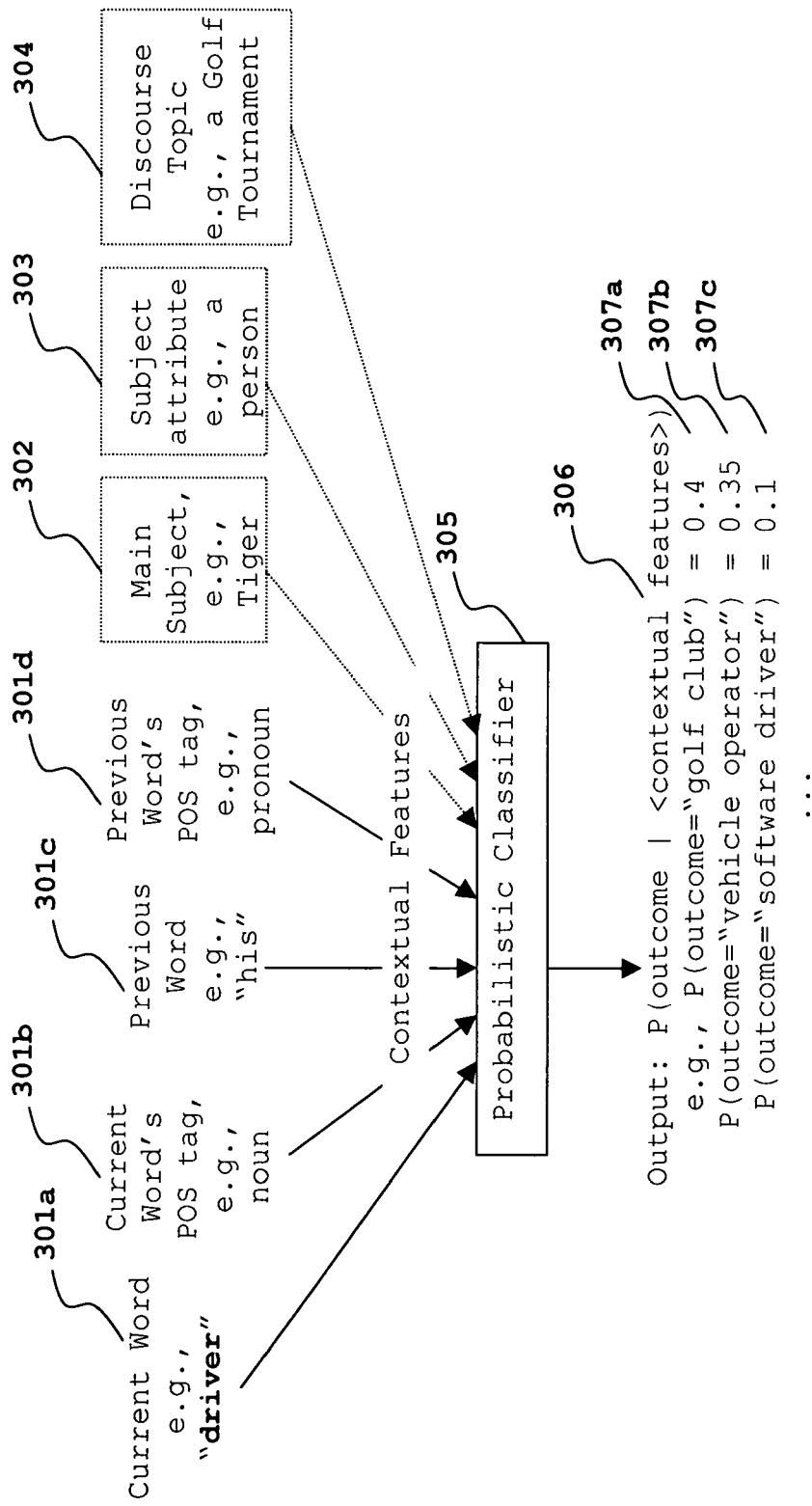
FIG. 3 illustrates how a probabilistic classifier incorporates varying amounts of context to generate its classification output.

FIG. 3 illustrates the probabilistic language disambiguation approach common to all modules, centered around a probabilistic classifier 305. This classifier computes the conditional probability of each possible outcome, given some contextual feature. In this example, we wish to compute the probability of each sense the word "driver" (the outcome), given various contextual features, such as the previous word being "his" and the following word being "was".

Before a classifier can compute this conditional probability, it first goes through a training phase. A series of training data where the correct outcome is known (e.g., the correct meaning of "driver"), given the contextual features (e.g., the surrounding words, the subject, the entire sentence, etc.) The classifiers adjust a set of parameters to best capture the outcome-contextual feature association. Different algorithms differ mainly in this step, on how the parameters are represented and adjusted during training such that the outcome accuracy is maximized. Thus, machine learning algorithms such as naive Bayes, maximum entropy models, decision trees, neural networks, etc., can be used to train the classifiers. Another possible embodiment is for a classifier to be composed of multiple sub-models, each being a classifier trained with different machine learning algorithms. The outputs of the sub-models are then integrated via a voting mechanism to improve accuracy.

Given a trained classifier, it can then compute the conditional probability of the outcome (e.g., POS tag, chunk tag, WSD sense, etc.) given some context from the input text. Illustrated in FIG. 3, contextual features such as the current word (301a and 301b) and the previous word (301c and 301d) are fed into a probabilistic classifier 305, which then calculates as output 306 the conditional probability of each outcome given these contextual features.

In this example, assume the input sentence is "Tiger replaced his driver before today's tournament". The classifier first determines the meaning of the word "driver" by relying solely on surrounding words and their POS tags as contextual features. Given the narrow context of "his driver before", the classifier is unsure of the decision and assigns similar probabilities (307a and 307b) to the "golf club" (0.4) and "vehicle operator" (0.35) meanings. However, given the wider context and prior knowledge (e.g., Tiger is a famous golf player), human readers would normally infer the "golf club" meaning as more likely.

Introduced in the present invention is the method in which information from deeper levels of language processing is used to refine earlier decisions by selectively expanding the context recovered from deeper level of processing.

These contexts can be the main SVO recovered from chunking or full parsing 302, as in this example the subject is "Tiger". Additionally, the semantic attribute of the subject being a person 303 recovered via name-entity recognition can be added (or anaphora resolution if the subject is "He" instead of "Tiger" for example). Furthermore, the discourse topic of golf tournament/sports event 304, recovered from discourse analysis, will further aid the disambiguation of the word sense of "driver" towards the "golf club" meaning. We have shown in Chao (2003) that indeed, these additional contexts do improve classifier accuracy by helping it make more informed decisions.

The conditional probabilities the classifiers generate (307a, 307b, 307c) become the default measure of confidence for each ambiguous decision. An unambiguous decision would have a confidence of 1.0, whereas a two-choice outcome that is completely uncertain would have a measure of 0.5 each. Thus, the more confident a disambiguation decision is, the closer the probability is to 1.0. These probabilities are then integrated across the entire sentence to find the most likely interpretation, calculated as the highest combined probability across the sentence using the well known Viterbi algorithm.

Thus, an application that receives ALP's output can use this confidence measure to gauge the reliability of each ambiguous decision. Using the previous example, if only basal level (POS tagging and WSD using only local context) of processing is done, the meaning of "driver" is highly uncertain and is reflected in the low probabilities. The application can choose to give this document lower priority. However, if more analysis is performed by ALP, the probability of the "golf club" meaning rises using the expanded context, reflected in the confidence measure. The application can then re-process this document and give it higher priority, since it has a higher confidence of the disambiguation accuracy.

Conclusion

We have described a method for resolving language ambiguities that is adaptive to the resources available (efficiency) and the depth of language processing done (accuracy). Therefore, the main benefits of the present invention are that it is an integrated approach to NLP and that it is adaptive to the needs of the users. It also lowers the "up-front" cost in deploying a system based on this method and is thus more scalable to large-scale, practical deployments. And since it is completely data-driven, the need for manual intervention and efforts is minimized. This method also automatically adapts to improvements due to the confidence measure introduced here. Any increase in computational power, amount of training data, and advances in natural language processing technologies can be incorporated to automatically improve the accuracy of not only one level of processing, but also the entire ALP model. Furthermore, these updates will not invalidate the processing done previously, often a valuable investment. Instead, documents are simply re-analyzed to improve their confidence measures. Applications utilizing this method's output would not need to be modified; they would only need to reprocess the re-analyzed documents to reap the benefits.

While the above description contains many specificities, these should not be construed as limitations on the scope of the invention, but rather as an exemplification of one preferred embodiment thereof. Many other variations are possible. Accordingly, the scope of the invention should be determined not by the embodiments illustrated, but by the appended claims and their legal equivalents.

What is claimed:

1. A method for resolving natural language ambiguities within text documents on a computer system comprising a processor and memory that would cause the processor to perform the following, comprising the steps of:
   i. training probabilistic classifiers from annotated training data containing a sense tag for each polysemous word;
   ii. processing said text documents into tokens and determining their part-of-speech tags;
   iii computing a measure of confidence using said probabilistic classifiers for each known sense of said tokens defined within a semantic lexicon based on contextual features and assigning a default sense for tokens absent from said semantic lexicon based on their part-of-speech tags;
   iv. determining assignment of word senses for each said token in said sentence such that the combined probability across said sentence is maximized; and
   v. integrating additional contextual features as generated by one or more of the following natural language processing modules into said probabilistic classifiers whereby said measure of confidence is improved: using a chunking module to identify multi-word phrases and the associated measure of confidence for each phrase;

using a named-entity recognition module to identify named entities and the associated measure of confidence for each entity; using a syntactic parsing module to construct sentential parse trees and the associated measure of confidence for each tree; using an anaphora resolution module to identify anaphor references and the associated measure of confidence for each reference; using a discourse categorization module to determine document categories and the associated measure of confidence for each category; using a discourse structure analysis module to determine discourse structures and the associated measure of confidence for each structure.

2. The method for resolving natural language ambiguities within text documents of claim 1, wherein said part-of-speech tag is generated by a part-of-speech tagger comprising the following steps:
training a probabilistic part-of-speech classifier using annotated training data containing a part-of-speech tag for each token;
computing outcome probabilities using said probabilistic part-of-speech classifier for each token for each sentence in said text documents based on contextual features;
determining assignment of part-of-speech tags for each said token in said sentence such that the combined probability across said sentence is maximized; and
integrating additional contextual features as generated by one or more of the following natural language processing modules into said probabilistic classifiers whereby said measure of confidence is improved:
using a word sense disambiguation module to determine word senses and the associated measure of confidence for each word;
using a chunking module to identify multi-word phrases and the associated measure of confidence for each phrase;
using a named-entity recognition module to identify named entities and the associated measure of confidence for each entity;
using a syntactic parsing module to construct sentential parse trees and the associated measure of confidence for each tree;
using an anaphora resolution module to identify anaphor references and the associated measure of confidence for each reference;
using a discourse categorization module to determine document categories and the associated measure of confidence for each category;
using a discourse structure analysis module to determine discourse structures and the associated measure of confidence for each structure.

3. The method for resolving natural language ambiguities within text documents of claim 1, further comprising, identifying multi-word phrases of said text documents using a chunking module whereby additional contextual features are extracted.

4. The method for identifying multi-word phrases of claim 3, comprising the following steps of:
training a probabilistic chunking classifier using annotated training data containing a chunk tag for each token;
computing outcome probabilities using said probabilistic chunking classifier for each token for each sentence in said text documents based on contextual features;
determining assignment of chunk tags for each said token in said sentence such that the combined probability across said sentence is maximized; and
integrating additional contextual features as generated by one or more of the following natural language processing modules into said probabilistic classifiers whereby said measure of confidence is improved:
using a word sense disambiguation module to determine word senses and the associated measure of confidence for each word;
using a named-entity recognition module to identify named entities and the associated measure of confidence for each entity;
using a syntactic parsing module to construct sentential parse trees and the associated measure of confidence for each tree;
using an anaphora-resolution module to identify anaphor references and the associated measure of confidence for each reference;
using a discourse categorization module to determine document categories and the associated measure of confidence for each category;
using a discourse structure analysis module to determine discourse structures and the associated measure of confidence for each structure.

5. The method for resolving natural language ambiguities within text documents of claim 1, further comprising resolving named-entity ambiguities of said text documents using a named-entity recognition module whereby additional contextual features are extracted.

6. The method for resolving named-entity ambiguities of claim 5, comprising the following steps of:
training a probabilistic named-entity classifier using annotated training data containing a named-entity tag for each token;
computing outcome probabilities using said probabilistic named-entity classifier for each token for each sentence in said text documents based on contextual features;
determining assignment of named-entity tags for each said token in said sentence such that the combined probability across said sentence is maximized; and
integrating additional contextual features as generated by one or more of the following natural language processing modules into said probabilistic classifiers whereby said measure of confidence is improved:
using a word sense disambiguation module to determine word senses and the associated measure of confidence for each word;
using a chunking module to identify multi-word phrases and the associated measure of confidence for each phrase;
using a syntactic parsing module to construct sentential parse trees and the associated measure of confidence for each tree;
using an anaphora resolution module to identify anaphor references and the associated measure of confidence for each reference;
using a discourse categorization module to determine document categories and the associated measure of confidence for each category;
using a discourse structure analysis module to determine discourse structures and the associated measure of confidence for each structure.

7. The method for resolving natural language ambiguities within text documents of claim 1, further comprising resolving structural ambiguities of said text documents using a syntactical parsing module whereby additional contextual features are extracted.

8. The method for resolving structural ambiguities of claim 7, comprising the following steps of:

inducing a grammar and training a probabilistic parse tree scorer using training data containing parse tree annotations;

scoring potential parse tree candidates acceptable by said grammar using said probabilistic parse tree scorer for each sentence in said text documents;

determining a parse tree that spans the entire said sentence having the highest score computed by said probabilistic parse tree scorer; and integrating additional contextual features as generated by one or more of the following natural language processing modules into said probabilistic classifiers whereby said measure of confidence is improved:

using a word sense disambiguation module to determine word senses and the associated measure of confidence for each word;

using a chunking module to identify multi-word phrases and the associated measure of confidence for each phrase;

using a named-entity recognition module to identify named entities and the associated measure of confidence for each entity;

using an anaphora resolution module to identify anaphor references and the associated measure of confidence for each reference;

using a discourse categorization module to determine document categories and the associated measure of confidence for each category;

using a discourse structure analysis module to determine discourse structures and the associated measure of confidence for each structure.

9. The method for resolving natural language ambiguities within text documents of claim 1, further comprising resolving anaphora references of said text documents using an anaphora resolution module whereby additional contextual features are extracted.

10. The method for resolving anaphora references of claim 9, comprising the following steps of:

training a probabilistic anaphora-alignment classifier using training data containing anaphora to antecedent annotations;

determining an anaphor to antecedent alignment for each anaphor in said text documents by maximizing the probability computed using said probabilistic anaphora-alignment classifier based on contextual features; and integrating additional contextual features as generated by one or more of the following natural language processing modules into said probabilistic classifiers whereby said measure of confidence is improved:

using a word sense disambiguation module to determine word senses and the associated measure of confidence for each word;

using a chunking module to identify multi-word phrases and the associated measure of confidence for each phrase;

using a named-entity recognition module to identify named entities and the associated measure of confidence for each entity;

using a syntactic parsing module to construct sentential parse trees and the associated measure of confidence for each tree;

using a discourse categorization module to determine document categories and the associated measure of confidence for each category;

using a discourse structure analysis module to determine discourse structures and the associated measure of confidence for each structure.

11. The method for resolving natural language ambiguities within text documents of claim 1, further comprising determining discourse categories of said text documents using a discourse category analysis module whereby additional contextual features are extracted.

12. The method for determining discourse categories of claim 11, comprising the following steps of:

training probabilistic discourse category classifiers using annotated training data containing discourse categories for each document;

determining discourse categories of said text documents by maximizing the probability computed using said probabilistic discourse category classifiers based on contextual features; and integrating additional contextual features as generated by one or more of the following natural language processing modules into said probabilistic classifiers whereby said measure of confidence is improved:

using a word sense disambiguation module to determine word senses and the associated measure of confidence for each word;

using a chunking module to identify multi-word phrases and the associated measure of confidence for each phrase;

using a named-entity recognition module to identify named entities and the associated measure of confidence for each entity;

using a syntactic parsing module to construct sentential parse trees and the associated measure of confidence for each tree;

using an anaphora resolution module to identify anaphor references and the associated measure of confidence for each reference;

using a discourse structure analysis module to determine discourse structures and the associated measure of confidence for each structure.

13. The method for resolving natural language ambiguities within text documents of claim 1, further comprising determining discourse structures of said text documents using a discourse structure analysis module whereby additional contextual features are extracted.

14. The method for determining discourse structures of claim 13, comprising the following steps of:

creating discourse structure templates containing slots to be filled by discourse subjects;

training probabilistic discourse structure classifiers for said templates and said slots using training data containing discourse structure annotations;

determining a discourse structure template of said text document by maximizing the probability computed using said probabilistic discourse structure classifiers based on contextual features;

filling slots of said discourse structure template by maximizing the probability computed using said probabilistic discourse structure classifiers based on contextual features; and integrating additional contextual features as generated by one or more of the following natural language processing modules into said probabilistic classifiers whereby said measure of confidence is improved:

using a word sense disambiguation module to determine word senses and the associated measure of confidence for each word;

using a chunking module to identify multi-word phrases and the associated measure of confidence for each phrase;

using a named-entity recognition module to identify named entities and the associated measure of confidence for each entity;

using a syntactic parsing module to construct sentential parse trees and the associated measure of confidence for each tree;

using an anaphora resolution module to identify anaphor references and the associated measure of confidence for each reference;

using a discourse categorization module to determine document categories and the associated measure of confidence for each category.

15. The method for resolving natural language ambiguities within text documents of claim 1, wherein said semantic lexicon is organized as an ontology.

16. An apparatus for use in a natural language processing system for resolving natural language ambiguities within text documents, comprising:

a trainer that trains probabilistic classifiers from annotated training data containing a sense tag for each polysemous word;

a part-of-speech processor that processes said text documents into tokens and determines their part-of-speech tags;

a classifier module that computes a measure of confidence using said probabilistic classifiers for each known sense of said tokens defined within a semantic lexicon based on contextual features and assigns a default sense for tokens absent from said semantic lexicon based on their part-of-speech tags;

a word sense disambiguator that determines assignment of word senses for each said token in said sentence such that the combined probability across said sentence is maximized; and a context integrator that integrates additional contextual features as generated by one or more of the following natural language processing apparatuses into said probabilistic classifiers whereby said measure of confidence is improved:

using a chunking apparatus that identifies multi-word phrases and the associated measure of confidence for each phrase;

using a named-entity recognition apparatus that identifies named entities and the associated measure of confidence for each entity;

using a syntactic parsing apparatus that constructs sentential parse trees and the associated measure of confidence for each tree;

using an anaphora resolution apparatus that identifies anaphor references and the associated measure of confidence for each reference;

using a discourse categorization apparatus that determines document categories and the associated measure of confidence for each category;

using a discourse structure analysis apparatus that determines discourse structures and the associated measure of confidence for each structure.

17. The apparatus for use in a natural language processing system of claim 16, wherein said part-of-speech processor comprises:

a probabilistic part-of-speech classifier that computes a probability for each token for each sentence in said text documents based on contextual features;

a trainer that trains said probabilistic part-of-speech classifier using annotated training data containing a part-of-speech tag for each token;

a part-of-speech assigner that determines assignment of part-of-speech tags for each said token in said sentence such that the combined probability across said sentence is maximized; and a context integrator that integrates additional contextual features as generated by one or more of the following natural language processing apparatuses into said probabilistic classifiers whereby said measure of confidence is improved:

using a word sense disambiguation apparatus that identifies the word senses and the associated measure of confidence for each word;

using a chunking apparatus that identifies multi-word phrases and the associated measure of confidence for each phrase;

using a named-entity recognition apparatus that identifies named entities and the associated measure of confidence for each entity;

using a syntactic parsing apparatus that constructs sentential parse trees and the associated measure of confidence for each tree;

using an anaphora resolution apparatus that identifies anaphor references and the associated measure of confidence for each reference;

using a discourse categorization apparatus that determines document categories and the associated measure of confidence for each category;

using a discourse structure analysis apparatus that determines discourse structures and the associated measure of confidence for each structure.

18. The apparatus for use in a natural language processing system of claim 16, further comprising a chunking apparatus that identifies multi-word phrases of said text documents whereby additional contextual features are extracted.

19. The chunking apparatus for identifying multi-word phrases of claim 18, comprising:

a probabilistic chunking classifiers that computes outcome probabilities for each token for each sentence in said text documents based on contextual features;

a trainer that trains said probabilistic chunking classifier using annotated training data containing a chunk tag for each token;

a chunk tag assigner that determines assignment of chunk tags for each said token in said sentence such that the combined probability across said sentence is maximized; and a context integrator that integrates additional contextual features as generated by one or more of the following natural language processing apparatuses into said probabilistic classifiers whereby said measure of confidence is improved:

using a word sense disambiguation apparatus that identifies the word senses and the associated measure of confidence for each word;

using a named-entity recognition apparatus that identifies named entities and the associated measure of confidence for each entity;

using a syntactic parsing apparatus that constructs sentential parse trees and the associated measure of confidence for each tree;

using an anaphora resolution apparatus that identifies anaphor references and the associated measure of confidence for each reference;

using a discourse categorization apparatus that determines document categories and the associated measure of confidence for each category;

using a discourse structure analysis apparatus that determines discourse structures and the associated measure of confidence for each structure.

20. The apparatus for use in a natural language processing system of claim 16, further comprising a named-entity recognition apparatus that resolves named-entity ambiguities of said text documents whereby additional contextual features are extracted.

21. The named-entity recognition apparatus for resolving named-entity ambiguities as recited in claim 20, comprising:
a probabilistic named-entity classifier that computes outcome probabilities for each token for each sentence in said text documents based on contextual features;
a trainer that trains said probabilistic named-entity classifier using annotated training data containing a named-entity tag for each token;
a named-entity assigner that determines assignment of named-entity tags for each said token in said sentence such that the combined probability across said sentence is maximized; and
a context integrator that integrates additional contextual features as generated by one or more of the following natural language processing apparatuses into said probabilistic classifiers whereby said measure of confidence is improved:
using a word sense disambiguation apparatus that identifies the word senses and the associated measure of confidence for each word;
using a chunking apparatus that identifies multi-word phrases and the associated measure of confidence for each phrase;
using a syntactic parsing apparatus that constructs sentential parse trees and the associated measure of confidence for each tree;
using an anaphora resolution apparatus that identifies anaphor references and the associated measure of confidence for each reference;
using a discourse categorization apparatus that determines document categories and the associated measure of confidence for each category;
using a discourse structure analysis apparatus that determines discourse structures and the associated measure of confidence for each structure.

22. The apparatus for use in a natural language processing system of claim 16, further comprising a syntactical parsing apparatus that resolves structural ambiguities of said text documents whereby additional contextual features are extracted.

23. The syntactical parsing apparatus for resolving structural ambiguities of claim 22, comprising:
a probabilistic parse tree scorer that scores potential parse tree candidates acceptable by a grammar for each sentence in said text documents;
a trainer that induces said grammar and trains said probabilistic parse tree scorer using training data containing parse tree annotations;
a parse disambiguator that determines a parse tree that spans the entire said sentence having the highest score computed by said probabilistic parse tree scorer; and
a context integrator that integrates additional contextual features as generated by one or more of the following natural language processing apparatuses into said probabilistic classifiers whereby said measure of confidence is improved:
using a word sense disambiguation apparatus that identifies the word senses and the associated measure of confidence for each word;
using a chunking apparatus that identifies multi-word phrases and the associated measure of confidence for each phrase;
using a named-entity recognition apparatus that identifies named entities and the associated measure of confidence for each entity;
using an anaphora resolution apparatus that identifies anaphor references and the associated measure of confidence for each reference;
using a discourse categorization apparatus that determines document categories and the associated measure of confidence for each category;
using a discourse structure analysis apparatus that determines discourse structures and the associated measure of confidence for each structure.

24. The apparatus for use in a natural language processing system of claim 16, further comprising of an anaphora resolution apparatus that resolves anaphora references of said text documents whereby additional contextual features are extracted.

25. The apparatus for resolving anaphora references of claim 24, comprising:
a probabilistic anaphora-aliqnment classifier that determines an anaphor to antecedent alignment for each anaphor in said text documents by maximizing the probability computed using based on contextual features;
a trainer that trains said probabilistic anaphora-alignment classifier using training data containing anaphora to antecedent annotations; and
a context integrator that integrates additional contextual features as generated by one or more of the following natural language processing apparatuses into said probabilistic classifiers whereby said measure of confidence is improved:
using a word sense disambiguation apparatus that identifies the word senses and the associated measure of confidence for each word;
using a chunking apparatus that identifies multi-word phrases and the associated measure of confidence for each phrase;
using a named-entity recognition apparatus that identifies named entities and the associated measure of confidence for each entity;
using a syntactic parsing apparatus that constructs sentential parse trees and the associated measure of confidence for each tree;
using a discourse categorization apparatus that determines document categories and the associated measure of confidence for each category;
using a discourse structure analysis apparatus that determines discourse structures and the associated measure of confidence for each structure.

26. The apparatus for use in a natural language processing system of claim 16, further comprising a discourse category analysis apparatus that determines discourse categories of said text documents whereby additional contextual features are extracted.

27. The apparatus for determining discourse categories of claim 26, comprising:
probabilistic discourse category classifiers that determine discourse categories of said text documents by maximizing the probability computed based on contextual features;
a trainer that trains said probabilistic discourse category classifiers for each category using annotated training data containing discourse categories for each document; and a context integrator that integrates additional contextual features as generated by one or more of the following natural language processing apparatuses into said probabilistic classifiers whereby said measure of confidence is improved:

using a word sense disambiguation apparatus that identifies the word senses and the associated measure of confidence for each word;

using a chunking apparatus that identifies multi-word phrases and the associated measure of confidence for each phrase;

using a named-entity recognition apparatus that identifies named entities and the associated measure of confidence for each entity;

using a syntactic parsing apparatus that constructs sentential parse trees and the associated measure of confidence for each tree;

using an anaphora resolution apparatus that identifies anaphor references and the associated measure of confidence for each reference;

using a discourse structure analysis apparatus that determines discourse structures and the associated measure of confidence for each structure.

28. The apparatus for use in a natural language processing system of claim 16, further comprising a discourse structure analysis apparatus that determines discourse structures of said text documents whereby additional contextual features are extracted.

29. The apparatus for determining discourse structures of claim 28, comprising:

a repository for storing discourse structure templates containing slots to be filled by discourse subjects;

probabilistic discourse structure classifiers that determine a discourse structure template of said text document by maximizing the probability computed based on contextual features;

a trainer that trains said probabilistic discourse structure classifiers for said templates and said slots using training data containing discourse structure annotations;

slot fillers that fill slots of said discourse structure template by maximizing the probability computed using said probabilistic discourse structure classifiers based on contextual features; and a context integrator that integrates additional contextual features as generated by one or more of the following natural language processing apparatuses into said probabilistic classifiers whereby said measure of confidence is improved:

using a word sense disambiguation apparatus that identifies the word senses and the associated measure of confidence for each word;

using a chunking apparatus that identifies multi-word phrases and the associated measure of confidence for each phrase;

using a named-entity recognition apparatus that identifies named entities and the associated measure of confidence for each entity;

using a syntactic parsing apparatus that constructs sentential parse trees and the associated measure of confidence for each tree;

using an anaphora resolution apparatus that identifies anaphor references and the associated measure of confidence for each reference;

using a discourse categorization apparatus that determines document categories and the associated measure of confidence for each category.

30. The apparatus for use in a natural language processing system of claim 16, wherein said semantic lexicon is organized as an ontology.

* * * * *